Patented Dec. 1, 1931

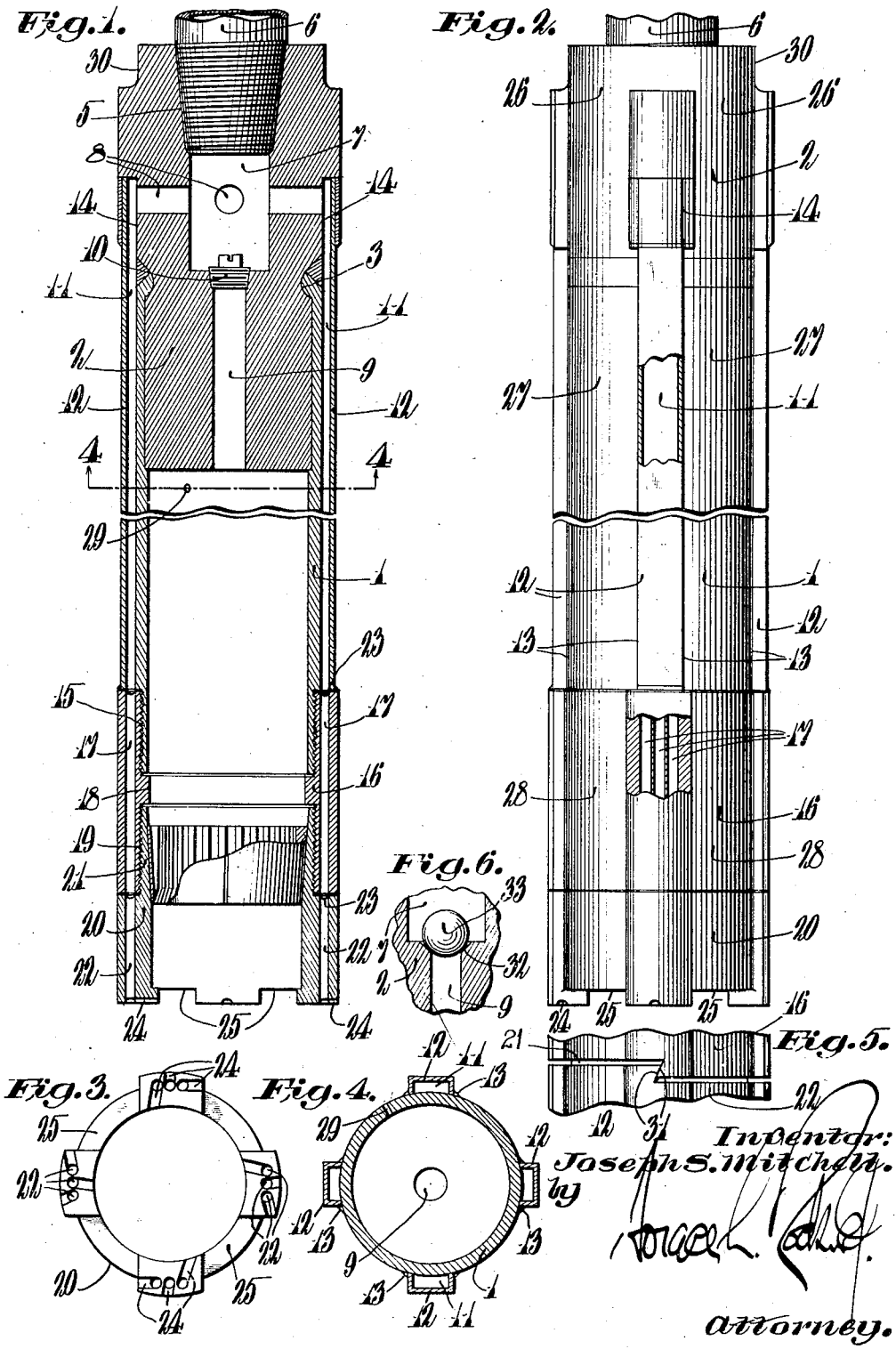

1,834,583

UNITED STATES PATENT OFFICE

JOSEPH S. MITCHELL, OF CHICAGO, ILLINOIS, ASSIGNOR TO SULLIVAN MACHINERY COMPANY, A CORPORATION OF MASSACHUSETTS

CORE DRILL

Application filed January 29, 1924. Serial No. 689,365.

My invention relates to core drills.

It has for its object to provide an improved core barrel. A more particular object of my invention is to provide an improved core barrel especially adapted to use in connection with mud fluid and in oil or gas well drilling, and having improved provision whereby the walls of the hole may be effectually sealed and an ample amount of mud fluid may be supplied to the bottom of the hole and maintained in circulation in such manner as to avoid sticking of the barrel in the hole.

In the accompanying drawings I have shown for purposes of illustration three forms which my invention may assume in practice.

In these drawings,—

Fig. 1 is a longitudinal section of a barrel constructed in accordance with my improvement.

Fig. 2 is a side elevation of the same, certain portions being in section to facilitate illustration.

Fig. 3 is an end view of the bit.

Fig. 4 is a sectional view on line 4—4 of Fig. 1.

Fig. 5 shows a modified form of joint, the parts being shown in partially released position.

Fig. 6 shows a modified form of axial fluid connection.

In this illustrative construction I have shown a core barrel especially adapted to use with mud fluid and especially adapted to use in oil or gas well drilling, although it will be evident that my invention may be used with other fluids and in drilling of any character.

In this construction I have illustrated a barrel comprising a cylindrical core receiving barrel member 1 of suitable length, herein in the form of tubing and as preferably having its internal diameter slightly increased adjacent its outer end to receive and seat the inner end of a head 2 suitably attached thereto. This head 2 is in turn herein shown to be grooved as at 3 intermediate its ends and adapted to receive the peened outer end of the member 1 which is welded thereto. As shown, the member 2 is also axially bored and threaded at its outer end as at 5, herein conically, to receive a suitable hollow rod line 6. An axial chamber 7 also communicates with the inner end of this bore and has a plurality of lateral outlet passages 8 leading off therefrom at points between its ends and below the rod line connection. A reduced axial passage 9 also leads from the chamber 7 into the usual larger axial core chamber within the member 1, this passage 9 in the illustrative form of my invention being closed when desired by a suitable closure, herein a threaded plug 10, removable from the outer end of the member 2.

Communicating with the lateral outlets 8, which are herein four in number, is a like number of longitudinal passages 11 exterior to the member 1 and formed by welding longitudinally disposed channel irons 12 to the outer periphery of the member 1, the edges of the channel irons herein being welded as at 13 to this surface of the member 1 throughout their length in such manner as to make the passages 11 fluid tight. As shown, the outer ends of the channel irons 12 are also suitably connected to the member 2 in such manner as to provide the desired strength and give a fluid tight fit, the same herein lying in longitudinal grooves 14 on an enlarged portion or head on the member 2 and welded in said grooves in such manner as to make a fluid tight joint externally coincident with the outer periphery of the plug 2. As shown, these channel irons extend approximately to the inner end of the member 1 terminating just short of an external threaded portion 15 of reduced section formed thereon.

Carried on this threaded portion is a winged member 16 of slightly larger external diameter than the member 1 and having a plurality of parallel passages 17 in the wings thereon communicating with the passages 11 and extending longitudinally through the member 16. In a preferred form, the member 16 is also welded to the members 12, thus providing a rigid and strong barrel with fluid tight connections. As illustrated, the member 15 is also provided with an internal annular shoulder 18 beneath the core chamber and with an internal threaded portion 19 below said shoulder adapted to receive a combined bit and core lifter winged member 20 having a correspondingly threaded core lifter portion 21 carrying therein any usual resilient core lifter and an inner winged bit carrying portion of larger diameter and herein of the same cross section and outside diameter as the member 16. This member 20 also has a plurality of suitable passages 22 extending longitudinally through its wings and communicating with the passages 17.

In this form of my invention the passages 22 as well as the passages 17 and the member 16 are in the form of a plurality of closely adjoining bored holes as this seems a simple way of forming the same while giving the desired area, but obviously the form of these passages may vary. Further, in order to insure the desired flow through these several passages 17, 22, without need for exact register, suitable grooves 23 are also provided in the top of the bit carrying portion of the member 20, these grooves being larger than the inlets of the passages 22 and extending across the same. Attention is also directed to the fact that passages 24 in the face of the bit are provided so that the mud fluid supplied longitudinally of the barrel may flow freely to different points on the surface being cut by the bit. Thus, for example, these grooves 24 are herein shown as extending inwardly, outwardly, forwardly, and backwardly in such manner that there will be no restriction to the free passage of mud fluid at the bottom of the hole. Attention is here also directed to the fact that the face of the bit is cut away as indicated at 25 in such manner as to form in effect a four-point or wing bit provided with fluid passages in its four working faces and ample clearance space between the working faces so that the fluid flow may be most effective. It will of course be understood that suitable cutting agents, such as diamonds or the like, (not shown) are carried on the working faces suitably disposed relative to the passages 24 in usual overlapping fashion.

In making up a core barrel of my improved construction I preferably, as shown, also make the greatest outside diameter of the member 2 the same as the outside diameter of the members 16 and 20. Moreover, it will be noted that the outer end of the member 2 is longitudinally slotted as shown at 26 between the portions slotted to receive the channel irons, to provide suitable fluid passages, thus in effect forming a fluted outer end which communicates with the flutes 27 on the reduced body of the barrel formed by the channel irons 12. Moreover, it will be noted that this same fluting is carried out on the members 16 and 20, suitably registering grooves 28 being formed therein between the winged portions in which the fluid conduits are formed, suitable registery of the winged elements, if necessary, being obtained by the use of shims as illustrated. Thus it will be observed that the core barrel is not only provided with an ample internal fluid flow but also with ample clearance for fluid flow up around the outside of the barrel, while the external fluting presents guiding surfaces effective to guide the barrel as desired, this guiding being especially important when it is considered that the barrel member 1, in oil well work for example, may be quite long, say, 20 feet or more in length. Here attention is also directed to the fact that the barrel is preferably provided with a restricted port or vent 29 near its outer end to permit the escape of air trapped when lowering the barrel in a hole, thus eliminating any air pressure in the barrel. Attention is also directed to the fact that the head 2 is reduced in external diameter at its outer end as shown at 30 to provide for guiding a cutting tool should it become necessary to cut away the outer part of the head and channels to free the core barrel should the latter be stuck.

In the operation of my improved construction it will be understood that fluid, for example mud fluid, is supplied from the rod line into the chamber 7 and from the latter out through the lateral passages 8 and into the passages 11, 17, 22 and 24 to the bottom of the hole, the amount of possible fluid flow being such and so distributed in my improved construction as to insure effective operation of the bit. From the bit, it will be evident that the fluid will be free to pass upward along the bit and barrel and out of the hole around the rods, the construction providing ample clearance for the fluid. It will herein be noted that the straight longitudinally extending wings on the exterior of the core barrel not only permit a free flow of mud fluid from the hole but also cause a portion of the mud fluid to be effectively thrown or slapped, by the centrifugal action of the rapidly rotating barrel, into the walls of the hole, sealing the latter against oil and gas pressures and preventing the oil sands from caving in. Obviously the flow of mud fluid will continue as the hole is deepened, the barrel gradually advancing along the core in the core chamber. When the chamber is filled and it is desired to remove the core, the whole barrel is lifted, the core lifter then gripping the core and breaking it off in a usual manner. Moreover, it will be noted that, after the barrel has been removed from the hole, should the core for any reason be stuck in the barrel, it is only necessary to remove the plug 10 and then by inserting a suitable tool, as for example, a one inch pipe, through the bore 9, force out the core which is stuck in the barrel. Obviously by removing the plug 10 it is also possible under certain conditions of work to supply fluid down through the core chamber as well as through the external passages, the barrel then operating as a single tube barrel. Obviously if at any time it becomes desirable to change over from such a single tube core barrel construction to a double tube core barrel construction, the plug 10 may be inserted whenever desired.

As a result of my improvement it will be noted that an improved core barrel is produced in which the fluid passages are such as to adapt the barrel to use with mud fluid with a minimum of sticking at the same time that the inside clearance is reduced to a minimum and the possible size of core is maintained at a maximum. Furthermore, it will be noted that the core is protected against washing when the plug 10 is used, the fluid not being circulated in contact with the core but instead being bypassed around the same and outside the core chamber in such manner as to enable the preservation of soft cores. Moreover, by the provision of the plug 10 and bore 9 it is also made possible to eliminate the cutting off of circulation by core blocking, and thus eliminate the difficulties previously encountered as a result of cessation of circulation.

In Fig. 5 I have illustrated a modified form of connection for the members 16 and 20 adapted to insure the desired alinement of the wings and fluid passages, shoulders 31 being provided on the adjacent surfaces in such manner as to insure the desired registry of the parts and eliminate the need for shims. In Fig. 6 I have also shown a modified construction which may under certain conditions be used in lieu of the plug 10, the outer end of the bore 9 in this construction being provided with a valve seat 32 and carrying a ball 33. Such construction is especially adapted to use when it is desired to lower through mud and operate as a single tube barrel and then later operate as a double tube barrel, the ball being left out during the lowering operation and when it is desired to operate as a double tube barrel, dropped down through the rod line so that it will find its place on the valve seat.

While I have in this application specifically described three forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. A core barrel having inner and outer ends having straight longitudinally extending external wings thereon and a rod line connection at its outer end, said ends being of substantially the same external diameter and adapted to substantially fit the drill hole to form longitudinally spaced guides for the barrel, and an externally winged intermediate cylindrical tubular portion of reduced external diameter, the wings on said ends and said intermediate portion having passages formed therein for conducting fluid from the rod line to the bottom of the drill hole.

2. A core barrel having externally winged inner and outer ends of substantially the same external diameter and adapted to substantially fit the drill hole to form longitudinally spaced guides for the barrel and having a rod line connection at its outer end, and an externally winged intermediate cylindrical tubular portion of reduced external diameter, the wings on said ends and said intermediate portion having passages formed therein for conducting fluid from the rod line to the bottom of the drill hole.

3. A core barrel having a central core receiving opening and inner and outer ends having straight longitudinally extending external barrel guiding wings formed thereon, an externally winged intermediate portion of reduced external diameter, and means for conducting fluid from said outer end along said intermediate portion and said inner end to the bottom of the barrel including fluid conducting passages formed in said wings.

4. A core barrel having winged inner and outer ends forming longitudinally spaced guides for the barrel and an externally winged intermediate portion of reduced external diameter, and fluid passages formed in said wings, said outer winged end having an inner fluid chamber communicating with said passages and said intermediate portion having a core chamber therein accessible from the outer end.

5. A core barrel having winged inner and outer ends forming longitudinally spaced guides for the barrel and an externally winged intermediate portion of reduced external diameter, and fluid passages formed in said wings, said outer winged end having an inner fluid chamber communicating with said passages and said intermediate portion having a core chamber therein communicating with said fluid chamber, and means for at will closing said latter communication.

6. A rotary core drill comprising a cylindrical tubular core barrel having a rod line connection at its upper end and a core receiving chamber in said barrel, an annular externally winged core cutting bit connected with the barrel and having core cutting elements thereon, a plurality of wings disposed lengthwise of said barrel along its periphery and secured on the exterior thereof, said wings extending substantially throughout the length of said barrel and having passages therein for conducting fluid externally of said barrel to the cutting bit, and means at the upper end of said barrel for directing the flow of fluid through said wings on said barrel and bit or at will directly to said core chamber.

7. A rotary core drill comprising a cylindrical tubular core barrel having a rod line connection at its upper end and a core receiving chamber in said barrel, an annular externally winged core cutting bit connected with the barrel and having core cutting elements thereon, a plurality of wings disposed lengthwise of the barrel along its outer periphery and secured on the exterior thereof, said wings extending substantially throughout the length of said barrel and having passages therein for conducting fluid externally of said barrel to the cutting bit, and means at the upper end of said barrel for enabling selective operation of said barrel as a single or double tube barrel.

8. A rotary core drill comprising a cylindrical tubular core barrel having a rod line connection at its upper end and a core receiving chamber in said barrel, an annular externally winged core cutting bit connected with the barrel and having core cutting elements thereon, a plurality of wings disposed lengthwise of the barrel along its periphery and secured on the exterior thereof, said wings extending substantially throughout the length of said barrel and having passages therein for conducting fluid externally of said barrel to the cutting bit, and means within the upper end of said barrel for enabling selective operation of said barrel as a single or double tube barrel including an axial bore and a removable closure therefor.

9. A core barrel comprising a winged head and a winged bit, said head and bit being of substantially the same diameter and adapted to substantially fit the drill hole to form longitudinally spaced guides for the barrel and having fluid passage means, and a cylindrical tubular reduced body portion connecting said head and bit and having members attached to its exterior having fluid passages therein connecting the passage means in said head and bit.

10. A core barrel comprising a head and bit and an intermediate operatively connected tubing of reduced diameter, and longitudinal open fluid conducting U-shaped channel members attached to the exterior of said tubing and closed at their inner sides thereby.

11. A core barrel comprising a head and bit carrying member and an intermediate operatively connected tubing of reduced diameter, and longitudinal fluid conducting U-shaped channel members attached to the exterior of said tubing and to said head and bit carrying member, the external surfaces of said tubing, head, and member closing the inner sides of said channel members.

12. A core barrel having a member adapted to carry a bit, said member having parallel laterally projecting straight wings formed thereon, a removable bit detachably secured to said member and having parallel laterally projecting straight wings formed thereon, said wings on said member and bit having fluid passages therein, means forming external fluid passages between the upper end of the barrel and said member for conducting fluid to the passages in the wings of said bit carrying member and said bit, and means for bringing the passages in said wings and said passage forming means into substantial registry to permit undiminished fluid flow without exact registry of said wings and said fluid passage forming means when the parts of said barrel are assembled.

13. In a core barrel, a winged head having longitudinal grooves in its wings, a winged bit carrying member, fluid passage means in each including fluid passages formed in the wings thereof, and a body member carrying fluid conducting channels seated in said grooves and connected to said bit carrying member, said channels being provided for conducting fluid from the fluid passages in said head to the fluid passages in said bit, said seat and connections being fluid tight.

14. A core barrel comprising a barrel member having a central core receiving passage and straight longitudinally extending wings formed thereon substantially throughout its length, a bit carried by said member at one end thereof, and fluid conducting means including fluid passages in said wings and between said wings for conducting fluid along said barrel member and bit to and from the bottom of the hole, and channels formed in the face of said bit for distributing the fluid laterally inwardly and outwardly at the bottom of the hole.

15. A core barrel comprising a core receiving barrel member winged substantially throughout its length and a winged bit carried at one end thereof, and fluid conducting means for conducting fluid along said barrel member and bit to and from the bottom of the hole including fluid passages inside the wings of said barrel member and bit and between said wings, and a plurality of lateral passages in certain of said wings for distributing the fluid in a plurality of directions laterally at the bottom of the hole.

16. A core barrel comprising a core receiving barrel member winged substantially throughout its length and a winged bit carried at one end thereof, and fluid conducting means for conducting fluid along said barrel member and bit to and from the bottom of the hole including fluid passages formed in the wings on said barrel member and bit and between said wings, and channels in the face of said bit for distributing the fluid in a plurality of directions laterally at the bottom of the hole.

17. A core barrel winged substantially throughout its length, a bit carried at one end thereof, and fluid conducting means for conducting fluid along said barrel to the bottom of the hole including fluid passages formed inside the wings and between the wings, and passages including cut-away portions in the face of the bit between certain of said wings for distributing the fluid laterally at the bottom of the hole.

18. A core barrel comprising a core receiving barrel member winged substantially throughout its length and a winged bit carried at one end thereof, and fluid conducting means for conducting fluid along said barrel member and bit to and from the bottom of the hole including fluid passages formed in the wings on said barrel member and bit and between said wings, and passages including cutaway portions in the face of the bit between each adjacent pair of wings for distributing the fluid laterally at the bottom of the hole.

19. A core barrel winged substantially throughout its length, a bit carried by said barrel, and fluid conducting means for conducting fluid along said barrel member and bit to and from the bottom of the hole including fluid passages formed inside said wings and between said wings, and passages including cutaway portions in the face of said bit between each adjacent pair of said wings and lateral fluid passages in the face of certain wings for distributing the fluid laterally at the bottom of the hole.

20. A core barrel winged substantially throughout its length, a winged bit carried by said barrel, and fluid conducting means for conducting fluid along said barrel and the bit to and from the bottom of the hole including fluid passages formed inside said wings on said barrel and bit and between said wings, and channels in the face of said bit including cutaway portions between each adjacent pair of wings and a plurality of lateral fluid passages in the face of each wing into which said passages in said wings discharge.

21. A core drill bit winged and provided with fluid passages extending generally longitudinally through the wings thereon and having lateral fluid passages extending in a plurality of directions inwardly and outwardly in the face of a wing.

22. A core drill bit winged and provided with fluid passages extending generally longitudinally through the wings thereon and having lateral fluid passages in the face of each wing, and a cutaway portion in its face between adjacent wings.

23. A core drill bit winged and provided with fluid passages extending generally longitudinally through the wings thereon and having lateral fluid passages in the face of each wing, and a cut-away portion in the face of the bit between said wings.

24. In a core barrel, a head having straight longitudinally extending mud throwing wings and grooves in its wings, a member having wings alined with the wings on said head and adapted to carry a bit, an intermediate body member carrying fluid conducting channels seated in said grooves and connected to said bit carrying member, and fluid conducting means for conducting fluid along the barrel through said channels to the bottom of the hole including fluid passages in said head and said bit carrying member.

25. A core barrel comprising a slotted head having wings thereon, a bit having wings thereon, an intermediate core receiving barrel member and fluid conducting means in said head, bit, and barrel member comprising members forming fluid conducting passages, each of said latter members having an end seated in a slot in said head and attached to the exterior of said barrel member.

26. A core barrel comprising a slotted head having wings thereon, a winged bit, an intermediate core receiving barrel member, a coupling between said bit and said barrel member, said coupling having wings thereon, and fluid conducting means in said head, bit, and coupling, said fluid conducting means comprising members having fluid conducting passages therein attached to the exterior of said barrel member and each having an end seated in a slot in said head.

27. A rotary core drill comprising a cylindrical tubular core receiving barrel member having a rod line connection at its upper end, an annular core cutting bit connected with the barrel member and having core cutting elements thereon, and means for conducting fluid from the rod line connection along the exterior of the barrel member to the bottom of the bit including a plurality of members of rectangular cross section disposed lengthwise of the barrel member along and closed at their inner sides by the outer periphery of the latter and having passages therein communicating with the interior of said rod line connection for delivering fluid externally of said barrel to said bit.

In testimony whereof I affix my signature.

JOSEPH S. MITCHELL.